Sept. 26, 1933.                J. WEINBERGER                1,927,860
                        BROADCAST TRANSMITTING SYSTEM
                             Filed Sept. 15, 1927

RADIATION IN VERTICAL PLANE

OVERHEAD WAVE
T   GROUND WAVE   R

RADIATION IN HORIZONTAL PLANE

60°
RADIATION IN VERTICAL PLANE

25°
25°
RADIATION IN
HORIZONTAL PLANE

TRANSMISSION LINES

40°  40°  40°  40°  40°  40°  40°  40°  40°

INVENTOR
JULIUS WEINBERGER
BY
ATTORNEY

Patented Sept. 26, 1933

1,927,860

UNITED STATES PATENT OFFICE 1,927,860

BROADCAST TRANSMITTING SYSTEM

Julius Weinberger, New York, N. Y., assignor to Radio Corporation of America, a corporation of Delaware Application September 15, 1927
Serial No. 219,788

3 Claims. (Cl. 250—11)

This invention relates to the art of radio signalling and deals more specifically with the elimination of the phenomenon of fading.

Fading may be explained as follows:

It is well known that the radiation from a simple vertical antenna, or T antenna, such as is normally used at a broadcasting station, in various vertical directions, may be represented by Fig. 1. Here the length of vectors drawn from the point 0 represent the radiation which goes off from the antenna at varying angles to the horizontal. The radiation is a maximum in a direction parallel to the earth and decreases towards the vetrical, becoming zero in a direction directly above the antenna. It is also well known that transmission from a broadcasting station to a listener takes place along more than one path, particularly at night, and it is the consensus of opinion at the present time that fading is due to transmission which reaches a listener simultaneously across ground, and by means of a more or less curved overhead path or by reflection. This is illustrated diagrammatically in Fig. 2, where "T" represents the location of the transmitter and "R" represents the location of the receiver.

Recent experiments have indicated that the overhead wave is bent down by means of a layer or region about 120 miles above the earth. This height has been determined for wave lengths between 300 and 500 meters, although it is probable that the height of the downward refracting layer or region varies with the wave length, season of the year and with day or night. The worst fading then is probably due to variations of transmission conditions in this layer, which cause the length of path of the overhead wave to vary slightly from moment to moment. We then would have a condition in which a variation of only one-half of a wave length would cause the two waves at the receiving point to coincide in phase, or be completely out of phase, thus resulting in a signal fluctuating from a value equal to double the intensity of either wave, down to zero.

It is therefore an object of this invention to minimize or prevent transmission of signals simultaneously by the direct path and by reflection, so that interference between the direct and reflection waves is reduced or prevented.

It is a further object of this invention to transmit radio frequency impulses in such a way that the impulses when received will not be capable of producing two or more out of phase fields.

Further, it is an object of this invention to utilize a predetermined path for signal transmission in a horizontal and/or vertical plane by means of a directive transmitter.

Further, it is an object of this invention to transmit signals by a direct path (without reflection) for a predetermined distance and to transmit signals by a reflected path for another predetermined distance.

And it is a further object of this invention to transmit radio frequency impulses at a predetermined angle with respect to the horizontal.

Finally it is an object of this invention to prevent fading by employing a directional transmitter.

These and other objects of the invention will be readily apparent to those skilled in the art from the following description taken in connection with the accompanying drawing in which.

In order to carry out my invention I arrange the transmitting antenna system at the broadcasting station so that radiation is confined to such an angle, with respect to the earth, that waves are not transmitted at a steep enough angle to reach the refracting layer, roughly 120 miles high, until considerably beyond the distance at which the ground wave has become largely attenuated. Thus transmission will be carried on from transmitting to receiving points either by means of the ground wave alone, or the overhead wave alone, but not by both simultaneously.

To this end it is necessary to arrange the transmitting antenna system so as to confine the radiation, as viewed in the vertical plane to angles of the order of 60 degrees or less to the horizontal.

Figure 3:
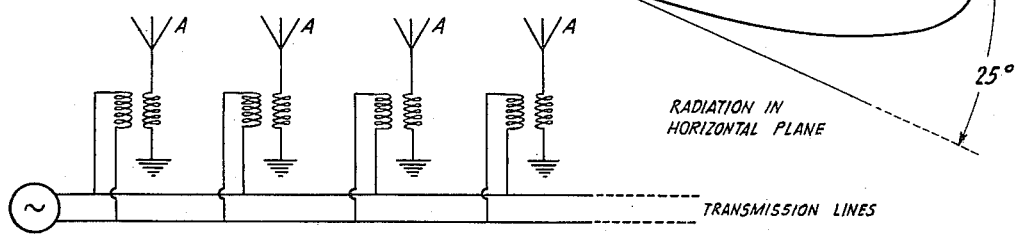
Fig. 3 is a diagrammatic showing of one embodiment of the invention.

One simple way of accomplishing this is to use a series of vertical antennæ spaced an appreciable fraction of a wave length apart, and spread out over a distance of the order of one or more wave lengths. Such an antenna system A is illustrated in Fig. 3, and is shown as fed by a transmission line supplied with high frequency energy from a source at the transmitting station.

Figure 1:
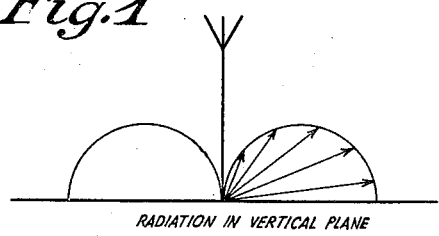
Fig. 1 is a transmission diagram of a normal broadcasting station.
Figure 2:
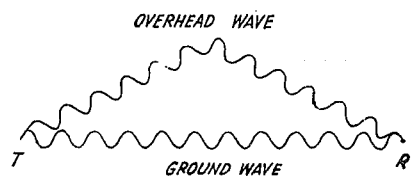
Fig. 2 is a diagrammatic representation of the normal path of radio frequency impulses between transmitter and receiver.
Figure 2:
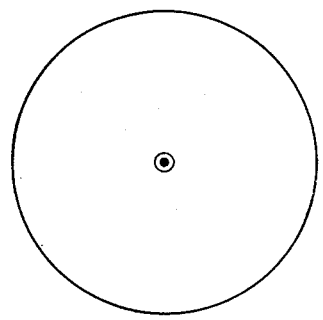
Figure 4:
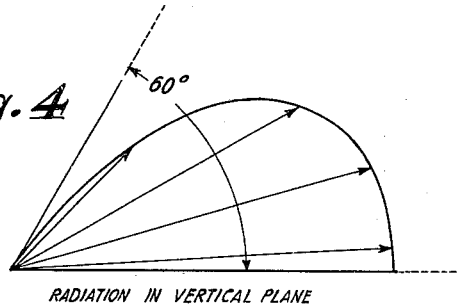
Fig. 4 is a transmission diagram of a system embodying the present invention.

The radiation diagram of such a system is shown in Fig. 4. The maximum radiation is concentrated in a single direction, and at limited angles to the horizontal. However, viewing the radiation in the horizontal plane, it will be noticed that here also the radiation is directional in nature. It is possible practically to build such an antenna system in which the angle to either side of the center line is 25 degrees, in the horizontal plane. In the vertical plane the radiation is confined to within 60 degrees from the horizontal.

Figure 5:
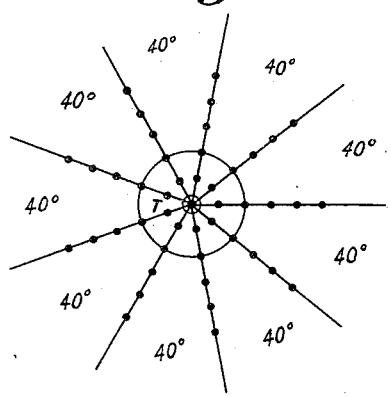
Fig. 5 is a diagram showing another embodiment of the invention.

At a broadcasting station a series of such antennæ would be arranged, so as to have the radiation diagrams in the horizontal plane overlap. A plan of a typical arrangement for this purpose is shown in Fig. 5. This consists of a radial assembly of a number of structures of the type shown in Fig. 4. At a coast-wise station it would not be necessary to have these antennæ directed towards the sea, but only along the coast and inland. In this way the energy would be concentrated in directions which would be useful to broadcast listeners.

The vertical antenna system which I have shown for accomplishing this object is not the only method of securing the desired type of directional radiation, and other methods will readily suggest themselves to those skilled in the art. I therefore do not intend to limit the scope of this invention except as outlined in the appended claims.

Having thus described my invention, what I claim is:

1. The method of eliminating fading in a radio signalling system which comprises directively transmitting signal impulses at a predetermined angle with respect to the horizontal, said signal impulses having a first component which travels substantially parallel to the surface of the earth and a second component which has a trajectory sufficiently high to cause the same to reach the heaviside layer, said angle being adjusted in such a way as to cause substantially only one of said components to be received at a given point, and receiving substantially only one of said components at said given point, whereby interference between said components is reduced.

2. The method of eliminating fading in a radio signalling system which comprises directively transmitting signal impulses at a predetermined angle with respect to the horizontal, said signal impulses having a first component which travels substantially parallel to the surface of the earth and a second component which has a trajectory sufficiently high to cause the same to reach the heaviside layer, said angle being of such magnitude that the received signals at one given point are comprised substantially only of said first mentioned component and the received signals at a second predetermined point are comprised substantially only of said second mentioned component and receiving one component only of said signals, whereby interference between said components at a given point is prevented.

3. The method of signalling by means of an aerial system including a plurality of spaced radiators energized in predetermined phase relation, which includes the steps of radiating energy from said system, directing the energy at an angle in a vertical plane passed through said system such that the energy reflected from the heaviside layer reaches the earth at a distance from the radiator at which the ground wave becomes attenuated and receiving energy over one of said paths only.

JULIUS WEINBERGER.